May 15, 1934.  N. P. V. BUUS  1,959,049
FRICTION BRAKE
Filed Oct. 20, 1930
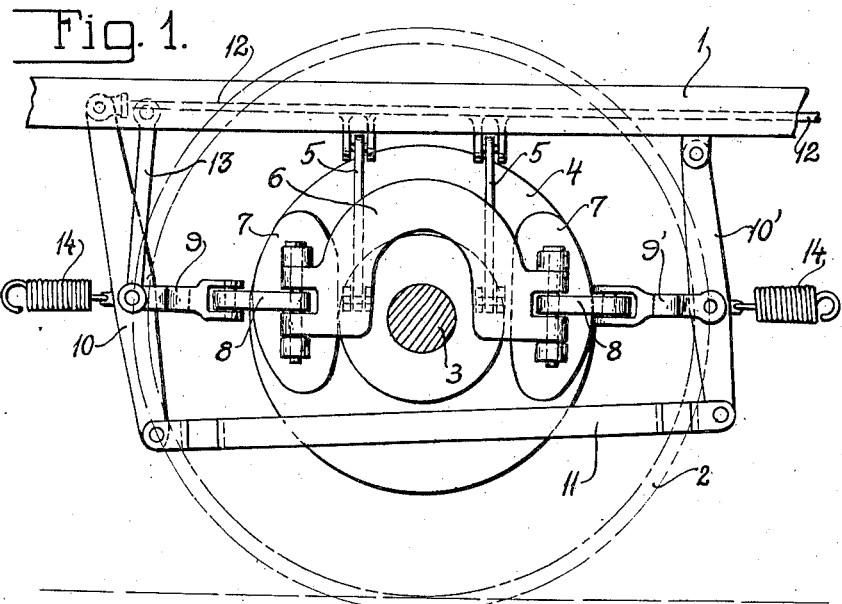
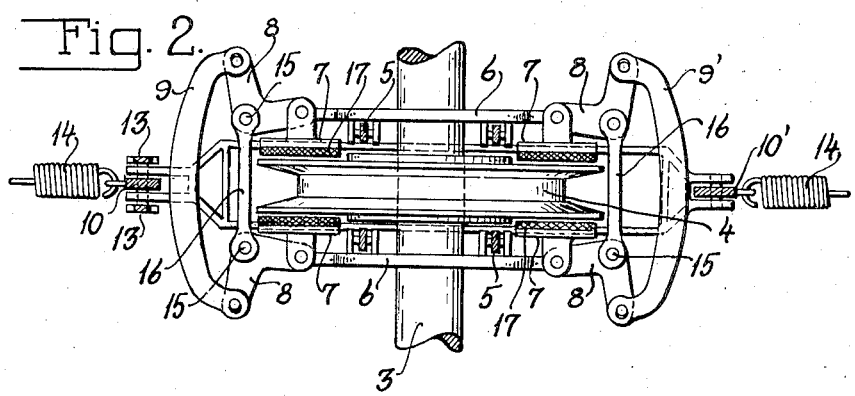
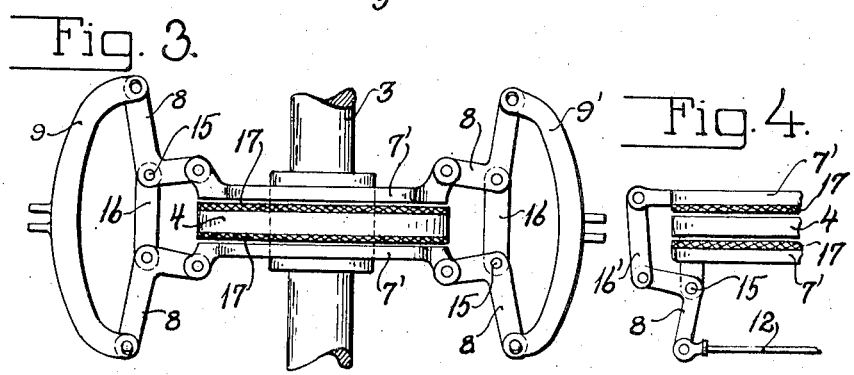
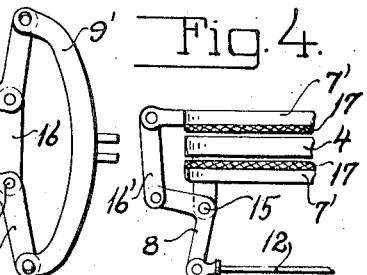
Inventor:
Niels Peter Valdemar Buus Patented May 15, 1934

1,959,049

UNITED STATES PATENT OFFICE 1,959,049

FRICTION BRAKE

Niels Peter Valdemar Buus, Copenhagen, Denmark

Application October 20, 1930, Serial No. 489,990
In Denmark October 22, 1929

1 Claim. (Cl. 188—72)

This invention refers to improvements in friction brakes particularly for rail vehicles such as tramway or railway vehicles and has for its object to provide a simple and effective arrangement whereby the braking effect obtained by a number of braking devices is compensated without applying any substantial bending stress to the axle.

According to the present invention a brake is provided having friction bodies acting on a brake disc mounted on an axle wherein the friction bodies are carried one at each end of a lever arm, preferably right angled, the other end of said arms being connected with a connecting rod mechanism by means of which the lever arms are rotated to force the friction bodies against the said brake disc.

The drawing shows three methods of carrying out the invention.

Figs. 1 and 2 show a side view and plan respectively of one embodiment of the invention.

Figs. 3 and 4 are plan views of two other embodiments of the invention.

In the arrangement shown in Figs. 1 and 2, 1 is a part of the floor carrier or buggy frame of the vehicle, 2 is one of the running wheels, 3 is the axle thereof, and 4 the brake disc.

The brake system consists of four angle arms 8 rotatable about bolts 15 and connected by rods 16 as well as by pieces 6 in a plane parallel to the brake disc 4. The angle arms 8 are connected at their inner ends to the brake bodies 7 with friction plates 17, the brake bodies 7 being carried on pieces 6 pivotally supported by four suspension rods 5 which, at their upper ends, are connected with the vehicle frame.

Two curved pieces 9 and 9' are connected with outer ends of the angle arms 8 which serve for the actuation of the brake. These are hinged to the more or less vertical rods 10, 10' of a connected rod system 10, 11, 10'. The upper end of rod 11 can be displaced by a connecting rod 12 in such manner, that the members 10 and 10' of the system are capable of being brought together or drawn apart by the springs 14, one of the curved pieces 9' being carried directly by the rotating arm 10' and the other 9 by two swinging arms 13.

When the curved pieces 9 and 9' are moved by pulling on the rod 12, against the pull of the springs 14 (which tend to bring the brake bodies 7 normally out of engagement with the brake bodies 7) the friction plates 17 will move in pairs against each other and finally rest on the side surfaces of the brake disc 4. On each brake body coming into position against the disc 4 this forms a fixed point of rotation for the other parts of the brake system and, the remaining brake bodies 7 are brought to bear on disc 4. Only when all the four brake bodies 7, 17 have been brought to bear on the brake disc 4 does the actual brake action commence at all four brake positions evenly, with mutual pressure equalization in pairs and without a bending stress on the axle 3. It is here a matter of indifference whether the friction plates 17 are quite new or much worn; the brake effect is in all cases the same, it only takes place with worn friction plates slightly later in the operative stroke than with unworn plates.

In practice, the arrangement is so constructed that the deflection outward of the arm of the angle lever 8 carrying the brake body 7 from its parallel position to the brake disc 4, is with a new friction disc 17 exactly as large as the deflection inwards from this parallel position with a worn friction disc, since then the variations from the maximum effect of the brake rod 12 are at a minimum.

In the form of construction of the brake shown in Fig. 3, the members 6 and 7 are formed into a ring shaped part 7' hinged on two opposite angle arms 8, the friction plates 17 also ring shaped being fixed to the brake disc 4 and rotating therewith, though the plates 17, can, if necessary, be fixed on the rings 7. The suspension of these parts can be arranged in similar manner to that in Figs. 1 and 2.

Fig. 4 shows a construction of the brake in which the operation is effected by means of an angle arm 8 rocking directly about a bolt 15 hinged on one of the brake bodies 7', and a connecting rod 16' connected with the second brake body.

The arrangement can also be carried out in a different manner without departing from the principle of the invention. For instance, the angle arms could impart a movement of two brake bodies from inside outwards on two brake discs separated from each other. The angle arm 8 in Fig. 4 could also be combined with a similar system 10, 11, 12 as shown by Fig. 1, and here also friction plate carriers 7 could be used instead of the friction ring carriers 7'.

I claim:

In a brake mechanism the combination of a brake disc or the like, two brake shoes arranged one on each side of the brake disc, an essentially right-angular bell crank lever attached to each brake shoe, a connection bar (9) pivoted to and connecting the extreme end of the bell crank lever arms, elongated pivot holes in said connection bar, a floating connection rod (16) connecting the rotation pivots of the two right-angular bell crank levers, and a stay rod attached to the connection bar for actuation purposes.

NIELS PETER VALDEMAR BUUS.